United States Patent
Tsiatsis et al.

(10) Patent No.: US 10,680,940 B2
(45) Date of Patent: Jun. 9, 2020

(54) OPTIMIZED COMPLEX EVENT PROCESSING IN A SOFTWARE-DEFINED NETWORK

(71) Applicant: Telefonaktiebolaget LM Ericsson (publ), Stockholm (SE)

(72) Inventors: Vlasios Tsiatsis, Solna (SE); Catalin Meirosu, Solna (SE); Konstantinos Vandikas, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 274 days.

(21) Appl. No.: 15/758,458

(22) PCT Filed: Sep. 10, 2015

(86) PCT No.: PCT/SE2015/050955
§ 371 (c)(1),
(2) Date: Mar. 8, 2018

(87) PCT Pub. No.: WO2017/044024
PCT Pub. Date: Mar. 16, 2017

(65) Prior Publication Data
US 2018/0248788 A1     Aug. 30, 2018

(51) Int. Cl.
*H04L 12/721* (2013.01)
*H04L 12/715* (2013.01)
(Continued)

(52) U.S. Cl.
CPC .......... *H04L 45/38* (2013.01); *H04L 41/0806* (2013.01); *H04L 45/42* (2013.01); *H04L 45/64* (2013.01); *H04L 41/12* (2013.01)

(58) Field of Classification Search
None
See application file for complete search history.

(56) References Cited

U.S. PATENT DOCUMENTS

2014/0298052 A1    10/2014  Meirosu et al.
2016/0142285 A1*   5/2016   Lee ................... H04L 69/22
                                                        370/392

FOREIGN PATENT DOCUMENTS

EP          2 911 347 A1      8/2015

OTHER PUBLICATIONS

ETSI, Network Functions Virtualisation (NFV); Infrastructure, Network Domain (Year: 2014).*

(Continued)

*Primary Examiner* — Ayanah S George
(74) *Attorney, Agent, or Firm* — Rothwell, Figg, Ernst & Manbeck, P.C.

(57) ABSTRACT

Optimized complex event processing in a software-defined network is provided. A computing device receives a rule that identifies a source device and an event notification condition. A network inventory structure that identifies a plurality of nodes in the network and corresponding processing capabilities is accessed. A particular datapath node of the plurality of nodes is identified. A packet flow window criterion and a packet operation are determined based on the event notification condition. A particular virtual network function (VNF) of a plurality of VNFs is identified based on the rule. A controller node datapath configuration command that comprises a source device identifier that identifies the source device, the packet flow window criterion, the packet operation, and a VNF identifier that identifies the particular VNF is generated. The controller node datapath configuration command is sent to a controller node of the plurality of nodes.

21 Claims, 9 Drawing Sheets

(51) Int. Cl.
    *H04L 12/717*     (2013.01)
    *H04L 12/24*     (2006.01)

(56) References Cited

OTHER PUBLICATIONS

International Search Report and Written Opinion issued in International Application No. PCT/SE2015/050955, dated Apr. 14, 2016, 12 pages.
ETSI GS NFV-INF 005, V1.1.1, Group Specification, Network Functions Virtualisation (NFV); Infrastructure; Network Domain, (Dec. 2014), Sophia Antipolis Cedex—France, 53 pages.
Reich, J. et al., "Modular SDN Programming with Pyretic", www.usenix.org, Oct. 2013, vol. 38, No. 5, 8 pages.
Foster, N. et al., "Frenetic: A High-Level Language for OpenFlow Networks", Cornell University, Computing and Information Science Technical Report, http://hdl.handle.net/1813/19310, Dec. 2010, 20 pages.
OpenFlow Switch Specification, Version 1.3.0 (Wire Protocol 0x04), Open Networking Foundation, Jun. 2012, ONF TS-006, 106 pages.
European Communication pursuant to Article 94(3) EPC dated May 27, 2019 issued in European Application No. 15 771 737.2 (7 pages).

* cited by examiner

OPTIMIZED COMPLEX EVENT PROCESSING IN A SOFTWARE-DEFINED NETWORK

CROSS REFERENCE TO RELATED APPLICATION(S)

This application is a 35 U.S.C. § 371 National Stage of International Patent Application No. PCT/SE2015/050955, filed Sep. 10, 2015, designating the United States, the disclosure of which is incorporated by reference.

TECHNICAL FIELD

The embodiments relate to complex event processing and software-defined networks, and in particular to optimizing complex event processing in a software-defined network.

BACKGROUND

Complex event processing (CEP) engines, sometimes referred to as stream processing (SP) engines, often reside on a cloud-based application server. A CEP system analyzes, in real-time, data streams generated by other electronic devices, such as, by way of non-limiting example, sensors. The CEP system analyzes such data streams by searching for one or more predetermined criteria, and if the one or more predetermined criteria are identified, the CEP system generates and sends a notification to a destination. CEP systems may be used to analyze data in a wide variety of different applications, including, by way of non-limiting example, national security, machine to machine (M2M) applications, Internet of things (IoT) devices, and charging/call data records (CDR).

The source devices that generate the data streams may generate data continually, such that a relatively large amount of data may be provided to the CEP system. However, because the predetermined criterion being identified may occur relatively infrequently, much of the data provided to the CEP system may ultimately utilize resources and bandwidth unnecessarily.

FIG. 1 is a block diagram of a system 10 illustrating a conventional CEP module 12. The CEP module 12 resides in a cloud computing environment application server 14. The system 10 also includes a software-defined network (SDN) 16 that includes an ingress datapath node 18-I and an egress datapath node 18-E. SDN is a network architecture where the forwarding plane (sometimes referred to as the data plane) and the control plane, which are conventionally implemented in a single network node, are separated and implemented in two distinct network nodes. Such distinct network nodes may be referred to as a datapath node and a controller node (not illustrated), respectively. An example of an SDN architecture, or specification, is the OpenFlow Switch Specification, version 1.3.0.

A source device 22 generates a relatively continual stream of packets 24-1-24-N (generally, packets 24) and transmits the packets 24 toward one or more destination devices 26 (only one illustrated for purposes of clarity). The source device 22 may comprise any suitable electronic device capable of generating packets of information that it may be desirable to examine. For purposes of illustration, assume that the source device 22 comprises a video camera positioned to capture imagery of an area. The source device 20 is coupled to the ingress datapath node 18-I which receives the packets 24. The ingress datapath node 18-I, based on a flow entry in a flow table (not illustrated), sends the packets 24 to the egress datapath node 18-E for delivery to the destination device 26. The ingress datapath node 18-I also sends, via a network 28, a copy of each packet 24 to the CEP module 12, for complex event processing. In this embodiment, for example, the CEP module 12 may analyze the imagery contained in the packets 24 to determine if a particular individual is depicted in the imagery. Thus, each packet 24 generated by the source device is duplicated and communicated to the CEP module 12, utilizing bandwidth of the network 28.

While for purposes of illustration only a single source device 22 is shown, tens or hundreds of source devices 22 may be concurrently generating data streams of packets 24, each of which may be provided to the CEP module 12, either via the ingress datapath node 18-I or via other ingress datapath nodes. For example, tens or hundreds of source devices 22 that comprise video cameras may collectively provide millions of packets of imagery of adjacent respective areas for analysis by the CEP module 12. In actuality, only a small percentage of such packets may depict any individuals at all, and consequently the majority of the packets provided to the CEP module 12 utilized bandwidth of the network 28 unnecessarily.

SUMMARY

The embodiments relate to mechanisms for optimizing complex event processing in a software-defined network. In one embodiment, a computing device receives a rule that identifies a source device and an event notification condition. A network inventory structure that identifies a plurality of nodes in the network and corresponding processing capabilities is accessed. A particular datapath node of the plurality of nodes is identified based on the source device and a corresponding processing capability of the particular datapath node. A packet flow window criterion and a packet operation are determined. A particular virtual network function (VNF) of a plurality of VNFs is identified based on the rule. A controller node datapath configuration command that comprises a source device identifier that identifies the source device, the packet flow window criterion, the packet operation, and a VNF identifier that identifies the particular VNF is generated. The controller node datapath configuration command is sent to a controller node of the plurality of nodes.

In another embodiment, a computing device is provided. The computing device includes a transceiver configured to be coupled to a network and a processor device coupled to a communication interface. The processor device is configured to receive a rule that identifies a source device and an event notification condition. The processor device is further configured to access a network inventory structure that identifies a plurality of nodes in the network and corresponding processing capabilities. The processor device is further configured to identify a particular datapath node of the plurality of nodes based on the source device and a corresponding processing capability of the particular datapath node. The processor device is further configured to determine a packet flow window criterion and a packet operation. The processor device is further configured to identify a particular virtual network function (VNF) of a plurality of VNFs based on the rule. The processor device is further configured to generate a controller node datapath configuration command that comprises a source device identifier that identifies the source device, the packet flow window criterion, the packet operation, and a VNF identifier that identifies the particular VNF. The processor device is further configured to send the controller node datapath configuration command to a controller node of the plurality of nodes.

In another embodiment, a method for sending an event notification is provided. A datapath node receives from a controller node a configuration command that identifies a source device, a packet flow window criterion, a packet condition, and a virtual network function (VNF) identifier. A flow entry is generated in a flow table that identifies a flow generated by the source device. A plurality of packets in the flow is received. The plurality of packets in the buffer is received based on the flow entry. It is determined that the plurality of packets in the buffer meets the packet condition. An event notification is sent to a VNF identified by the VNF identifier indicating that the packet condition has been met.

In another embodiment, a computing device is provided. The computing device includes a transceiver configured to be coupled to a network, and a processor device coupled to a communication interface. The processor device is configured to receive, from a controller node, a configuration command that identifies a source device, a packet flow window criterion, a packet condition, and a virtual network function (VNF) identifier. The processor device is further configured to generate a flow entry in a flow table that identifies a flow generated by the source device. The processor device is further configured to receive a plurality of packets in the flow. The processor device is further configured to buffer the plurality of packets in a buffer based on the flow entry. The processor device is further configured to determine that the plurality of packets in the buffer meets the packet condition. The processor device is further configured to, based on determining that the plurality of packets in the buffer meets the package condition, send an event notification to a VNF identified by the VNF identifier indicating that the packet condition has been met.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims. Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first event notification" and "second event notification," and does not imply a priority, a type, an order, an importance, or other attribute, unless otherwise stated herein.

Figure 2:
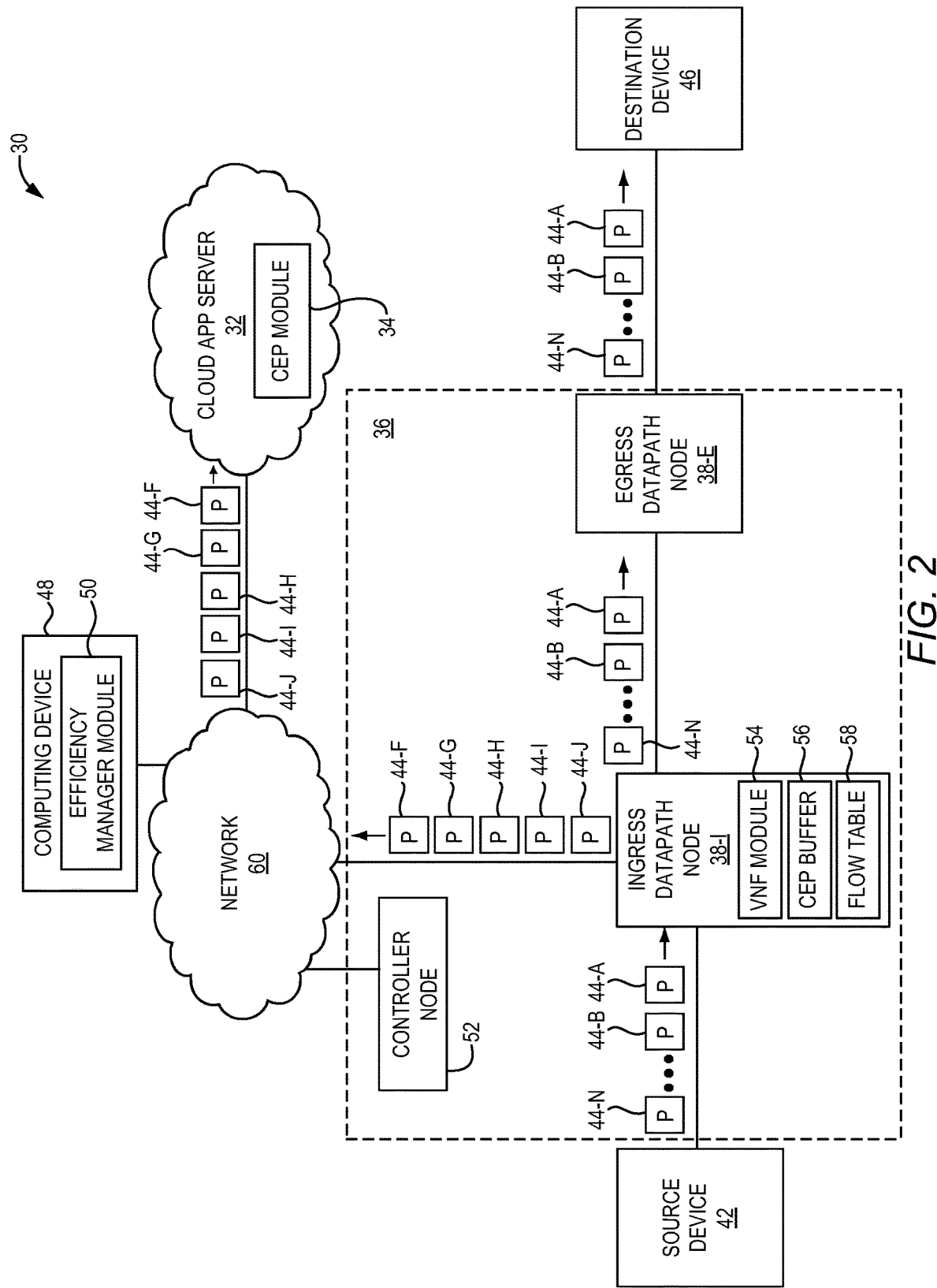
FIG. 2 is a block diagram of a system in which embodiments for optimizing complex event processing in a software-defined network may be implemented.

FIG. 2 is a block diagram of a system 30 in which embodiments for optimizing complex event processing in a software-defined network may be implemented. The system 30 includes a cloud computing environment application server 32 that includes a complex event processing (CEP) module 34 that resides in the cloud computing environment application server 32. The system 30 also includes a software-defined network (SDN) 36 that includes an ingress datapath node 38-I and an egress datapath node 38-E (generally, datapath nodes 38). An SDN is a network architecture in which the forwarding plane (sometimes referred to as the data plane) and the control plane, which are conventionally implemented in a single network node, are separated and implemented in two distinct network nodes. Such distinct network nodes may be referred to as a datapath node and a controller node, respectively. An example of an SDN architecture, or specification, is the OpenFlow Switch Specification, version 1.3.0.

A source device 42 generates a relatively continual stream of packets 44-A-44-N (generally, packets 44) and transmits the packets 44 toward a destination device 46. The source device 42 may comprise any suitable electronic device capable of generating packets of information that it may be desirable to examine. For purposes of illustration, assume that the source device 42 comprises a temperature sensor that generates data that identifies a current temperature of an item, or an ambient environment. The source device 42 is coupled to the ingress datapath node 38-I which receives the packets 44. The ingress datapath node 38-I, based on a flow entry in a flow table (not illustrated), communicates the packets 44 to the egress datapath node 38-E for delivery to the destination device 46. It should be noted that the designation of the datapath node 38-I as an ingress datapath node and the designation of the datapath node 38-E as an egress datapath node is solely in the context of a particular flow of packets, in this example, the flow of packets from the source device 42. With respect to other flows of packets from other devices, the ingress datapath node 38-I may serve as an egress datapath node, and the egress datapath node 38-E may serve as an ingress datapath node. Thus, a datapath node 38 may concurrently be an ingress datapath node for some flows and an egress datapath node for other flows.

The system 30 also includes a computing device 48 that comprises an efficiency manager module (EMM) 50. As will be described in greater detail with reference to FIG. 3, among other features, the EMM 50 receives one or more high-level application rules that identify complex event processing conventionally performed by the CEP module 34. The goal of the EMM 50 is to implement processing that reduces the number of packets 44 provided to the CEP module 34 based on the content of the packets generated by the source device 42. In one embodiment, the EMM 50 decomposes the high-level application rules, and based on the decomposition sends configuration commands to a controller node 52 of the SDN 36. The controller node 52, based on the configuration commands, sends commands, such as OpenFlow commands, to the ingress datapath node 38-I that include a packet flow window criterion and a datapath node work clause. Such commands may be in conjunction with setting up a new flow in the ingress datapath node 38-I that identifies how the packets 44 received from the source device 42 should be processed. While for purposes of illustration only a single controller node 52 is illustrated, the SDN 36 may have any number of controller nodes 52. The controller node 52 and datapath nodes 38 may be collectively referred to herein as nodes.

The controller node 52 also, based on the configuration commands, initiates a virtual network function (VNF) module 54 on, in this example, the ingress datapath node 38-I. For purposes of illustration, assume that the packet flow window criterion indicates that groups of five packets 44 received from the source device 42 should be buffered, and the datapath node work clause indicates that an average temperature identified in the five packets should be calculated, and if the average temperature is over a predetermined threshold, a message should be sent to the VNF module 54.

The ingress datapath node 38-I receives the OpenFlow commands and enters a new flow entry (not illustrated) in a flow table 58 of the ingress datapath node 38-I that identifies how packets 44 received from the source device 42 should be processed. As the ingress datapath node 38-I receives the packets 44 from the source device 42, the ingress datapath node 38-I buffers five consecutive packets 44 in a CEP buffer 56. The ingress datapath node 38-I provides the five packets 44 to the egress datapath node 38-E for delivery to the destination device 46. The ingress datapath node 38-I also analyzes the first five packets 44 in the CEP buffer 56 and determines that the average temperature identified in the five packets 44 does not exceed the predetermined threshold. The ingress datapath node 38-I then clears the CEP buffer 56, and does not notify the VNF module 54, or provide the five packets 44 to the CEP module 34.

In some embodiments it may be desirable to store all packets 44 for purposes of legal intercept. Such storage may take place in a non-critical path storage node, and the packets 44 may be collected when the network is in a lightly loaded state. Thus, the embodiments may facilitate decreasing the packet volume at peak times when all the packets 44 should be saved, as well as decreasing the packet volume in the network when not all the packets 44 need to be saved.

The ingress datapath node 38-I receives the next five packets 44-F-44-J from the source device 42 and buffers the packets 44-F-44-J in the CEP buffer 56. The ingress datapath node 38-I also provides the five packets 44-F 44-J to the egress datapath node 38-E for delivery to the destination device 46. The ingress datapath node 38-I analyzes the five packets 44-F-44-J in the CEP buffer 56 and determines that the average temperature identified in the five packets 44-F-44-J exceeds the predetermined threshold. The ingress datapath node 38-I generates a message and communicates the message to the VNF module 54. The message may include the packets 44-F-44-J, data extracted from the packets 44-F-44-J, or a pointer or other reference to the CEP buffer 56 that the VNF module 54 may utilize to access the CEP buffer 56.

The VNF module 54 performs additional processing which may include additional filtering, to determine an event notification condition. For example, the VNF module 54 may be designed to only provide packets 44 to the CEP module 34 during certain timeframes throughout a day. The VNF module 54 determines that the current time is within such certain timeframes, generates an event notification, and communicates the event notification to the CEP module 34 via a network 60. The event notification may include additional information, such as the packets 44-F-44-J.

Figure 3:
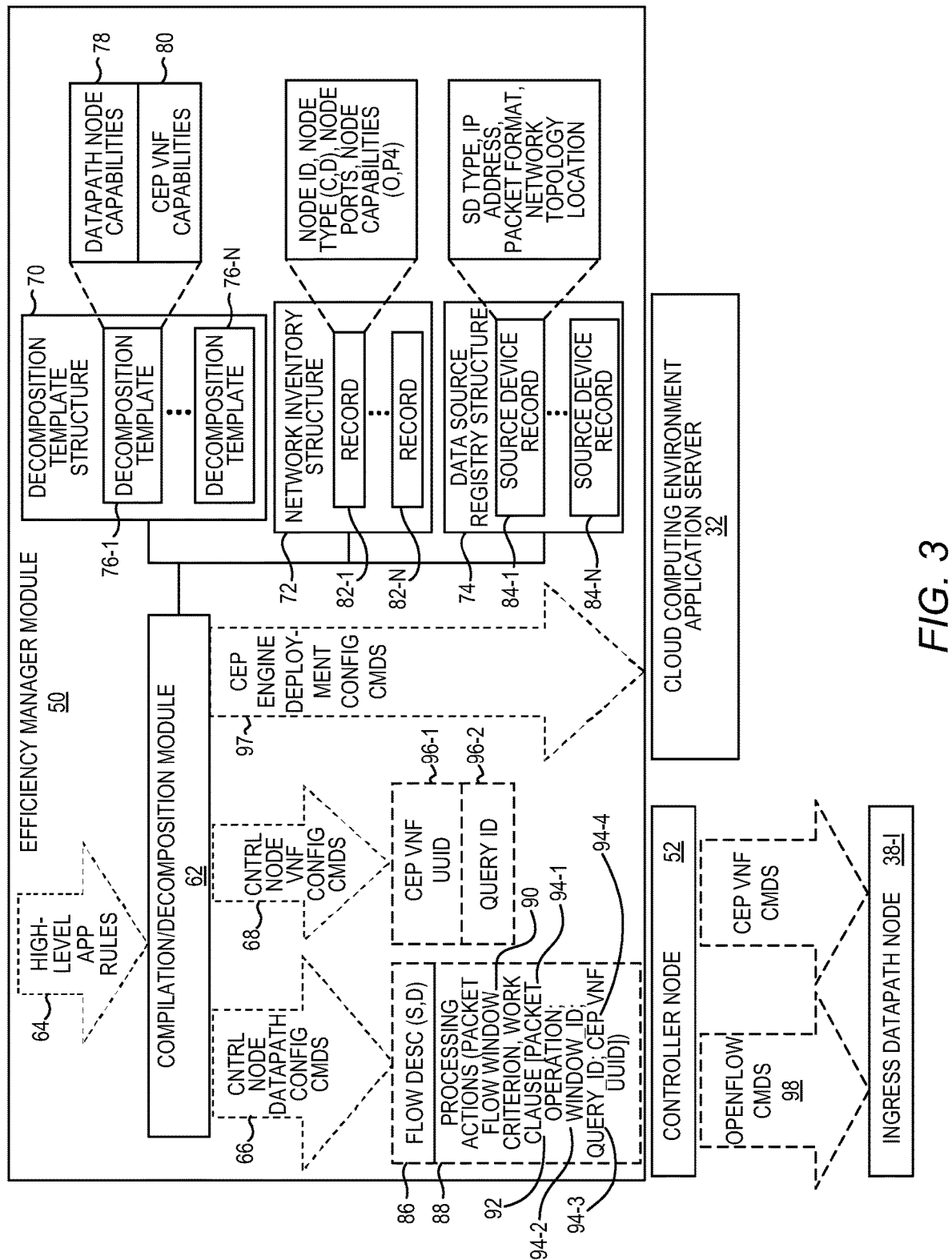
FIG. 3 is a block diagram of an efficiency manager module 50 according to one embodiment.

FIG. 3 is a block diagram of the EMM 50 according to one embodiment. The EMM 50 includes a compilation/decomposition module (CDM) 62 that receives one or more high-level application rules 64. The high-level application rules 64 may identify one or more particular source devices 42 (FIG. 2), desirable property names of the data sources (e.g., a face recognized by camera), and an event notification condition, such as, by way of non-limiting example, "If detected face in Times Square matches this pattern, then produce notification." The pattern to be matched may also be provided. In some embodiments, the high-level application rules 64 may comport with a Domain Specific Language (DSL) specification.

The CDM 62, based on the high-level application rules 64, determines a set of low-level network instructions expressed in a language that the controller node 52 understands how to execute. In particular, the CDM 62 generates controller node datapath configuration commands 66 and controller node VNF configuration commands 68, the contents of which will be discussed in greater detail herein. Such high-level application rules 64 may be written in any desired syntax, including, by way of non-limiting example, Frenetic or Pyretic, but the embodiments are not limited to any particular syntax or format. In the context of a SDN, the controller node datapath configuration commands 66 may comprise sequences of commands for a specific OpenFlow controller. The controller node datapath configuration commands 66 may include information identifying the particular datapath node(s) that are to be configured. In some embodiments, the controller node 52 receives the controller node datapath configuration commands 66 over an interface sometimes referred to as the Northbound Interface, which may comprise either a proprietary interface or a public interface. The controller node 52 may further translate the controller node datapath configuration commands 66 into OpenFlow protocol packets that it in turn sends to the appropriate datapath nodes.

To generate the controller node datapath configuration commands 66 and the controller node VNF configuration commands 68, the CDM 62 may interface with a number of data structures, including, by way of non-limiting example, a decomposition template structure 70, a network inventory structure 72 and a data source registry structure 74. While for purposes of illustration the decomposition template structure 70, the network inventory structure 72, and the data source registry structure 74 are illustrated as being integrated into the EMM 50, in other embodiments such structures may be communicatively coupled to the EMM 50.

A first phase of the CDM 62 may be referred to as a decomposition phase. The decomposition phase includes a determination of what processing identified in the high-level application rules 64 may be implemented in a datapath node, and what processing identified in the high-level application rules 64 may be implemented in a VNF process. In one embodiment, decomposition template structure 70 comprises a plurality of decomposition templates 76-1-76-N (generally, decomposition templates 76). Each high-level application rule 64 corresponds to one or more of such decomposition templates 76. Each decomposition template 76 includes a datapath node capabilities field 78 that identifies what processing portion of the high-level application rule 64 may be performed by the datapath node 38, and a CEP VNF capabilities field 80 that identifies what processing portion of the high-level application rule 64 may be performed by a VNF process. For example, in a context of a high-level application rule 64 relating to CEP associated with one or more source devices 42 that sense temperatures, the relevant decomposition template 76 may indicate that a "select * from temperature" processing portion is to be executed by the VNF module 54, while a "window(5)" and "avg(temperature)>25" processing portion is to be performed by a datapath node 38. As another example, in a context of a high-level application rule 64 relating to CEP associated with one or more source devices 42 that comprise cameras, the relevant decomposition template 76 may indicate that a "select * from cameras" processing portion and a "FaceDetected==True" processing portion may be executed in the VNF module 54, while a "window(10)" processing portion may be executed in a datapath node 38.

The network inventory structure 72 contains information regarding the various elements that may be utilized to optimize the efficiency of CEP, including, for example, the controller nodes 52 and the datapath nodes 38 (collectively referred to herein as nodes), and VNF modules 54. In particular, in one embodiment, the network inventory structure 72 includes a plurality of records 82-1-82-N (generally, records 82). Each record 82 identifies a node that may be utilized to optimize the efficiency of CEP, such as the SDN controller node 52, the datapath node 38, or the VNF module 54. The records 82 may include any suitable information, including, by way of nonlimiting example, a node identifier that uniquely identifies the corresponding controller node 52 or datapath node 38, a node type that identifies whether the corresponding node is a controller node 52 or a datapath node 38, the ports associated with the corresponding node, and node capabilities. The node capabilities may identify, for example, types of instructions that the node is capable of interpreting, such as OpenFlow instructions and/or P4 instructions, and the like. The network inventory structure 72 may also contain information that identifies the topology and interconnections of the controller nodes 52 and datapath nodes 38 in the SDN 36. The records 82 may also identify how deep of a buffer (sometimes referred to herein as a "window") a particular datapath node 38 is capable of maintaining. With regard to a particular VNF module 54, the records 82 may identify a location of the VNF module 54, a CEP VNF universally unique identifier (UUID) that uniquely identifies the VNF module 54, and a functionality implemented by the VNF module 54.

The network inventory structure 72 may be generated offline manually, or through a discovery step for each new controller node 52 and datapath node 38 that is added to the SDN 36.

The data source registry structure 74 identifies source devices 42. In particular, the data source registry structure 74 contains a plurality of source device records 84-1-84-N (generally, source device records 84). Each source device record 84 corresponds to a particular source device 42 and may identify, for example a type of the source device 42, such as a camera, a temperature sensor, and the like, an IP address of the source device 42, a packet format of the packets, or messages, that are generated by the respective source device 42, a network topology location of the source device 42, such as which ingress datapath node 38-I receives packets generated by the source device 42.

With regard to the packet format, for example, if the source device 42 is a camera, the packet format may indicate that an image exists in the packet field "APP Data" that starts from byte 128 and has a format of text with a MIME type X. This information may be used by the EMM 50 to decompose the high level app rules 64. In some embodiments, this information may be part of an internal or external registry that is interrogated by the EMM 50, or the source device 42 may provide the respective packet format.

Based on the high-level application rules 64, the decomposition template structure 70, the network inventory structure 72, and the data source registry structure 74, the CDM 62 generates the controller node datapath configuration commands 66 and the controller node VNF configuration commands 68. In one embodiment, the controller node datapath configuration commands 66 may include a flow descriptor 86 that identifies a source, or ingress, datapath node 38 that receives a flow of packets from a particular source device 42, and a destination, or egress, datapath node 38 to which such packets are ultimately destined in the SDN 36 for delivery to a destination device coupled to the egress datapath node 38. The controller node datapath configuration command 66 may also include a processing actions field 88 that contains a packet flow window criterion 90 and a work clause 92.

The packet flow window criterion 90 identifies a window size of a number N of packets that are to be buffered by the datapath node 38 in the CEP buffer 56. The packet flow window criterion 90 may also identify a timeout value that identifies a maximum period of time the datapath node 38 should wait to receive the N packets. If the N packets have not been received within the maximum period of time, the datapath node 38 clears the CEP buffer 56 and resets a timer. In some embodiments, upon determining that a timeout has occurred, the datapath node 38 may first invoke the work clause 92 to process the packets in the CEP buffer 56, and then clear the CEP buffer 56.

The work clause 92 includes, for example, one or more relatively simple packet operations that may be performed on fields in packets 44 stored in the CEP buffer 56 when the window size is reached. For example, the packet operations may comprise a sum, or an average, value of one or more fields of data in the packets 44. One or more packet conditions may also be identified in the work clause 92. In one embodiment, parameters in the work clause 92 may include a packet operation parameter 94-1 (code of a mathematical operation, represented as an integer, for example 0 representing addition, 1 subtraction, 2 multiplication, and the like), a Window_id parameter 94-2 that identifies a CEP buffer 56 to which the particular work clause 92 is associated, a Query_id parameter 94-3 which identifies a query with which the work clause 92 is associated, and a CEP VNF UUID parameter 94-4 that identifies a particular VNF module 54 to which a message is to be sent if the packet condition or conditions evaluate to a value of true.

The controller node VNF configuration command 68 may include a CEP/VNF UUID parameter 96-1 that uniquely identifies a particular VNF module 54. The controller node VNF configuration command 68 may also include a Query_id parameter 96-2 which identifies a query that may be performed by the VNF module 54 when messages are received that identify such query.

In one embodiment, the CDM 62 may also generate one or more CEP engine deployment configuration commands 97 that identify one or more CEP modules 34 that are to be instantiated in the cloud computing environment application server 32.

The controller node 52 receives the controller node datapath configuration commands 66 and the controller node VNF configuration commands 68. The controller node 52 may translate the controller node datapath configuration commands 66 into suitable OpenFlow protocol commands 98, or other SDN protocol commands, and communicate such commands to the appropriate datapath node(s) 38. The controller node 52 receives the controller node VNF configuration commands 68, and may take suitable actions to instantiate the VNF module 54.

Figure 1:
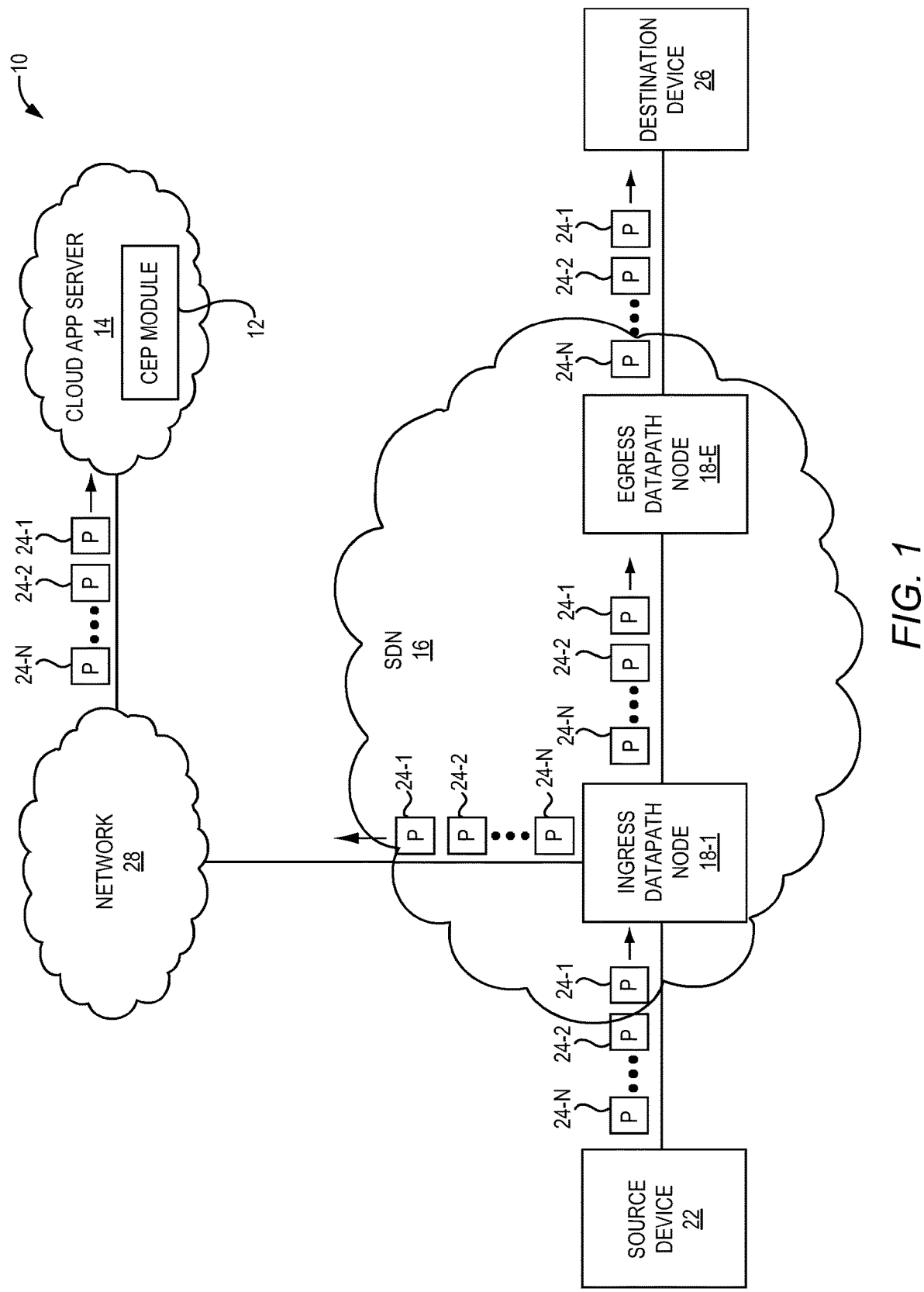
FIG. 1 is a block diagram of a system illustrating a conventional complex event processing module.

Table 1 below contains an example code snippet that an application in the cloud computing environment application server 14 may utilize to invoke a CEP module 12 (FIG. 1). The example code snippet comprises a high level application rule 64, according to one embodiment. The example code snippet is written in Java and an event processing domain specific language suitable for the ESPER CEP engine available from EsperTech Inc., Wayne, N.J. 07474-3129, USA, but the embodiments are not limited to any particular event processing language. In the present embodiments, the EMM 50 may decompose the high level application rule 64 such that the analysis performed in line 7 is implemented in the ingress datapath node 38-I and/or the VNF module 54. In one embodiment, the EMM 50 may implement lines 9-11 of the example code snippet in the VNF module 54, such that the generated event, which was previously performed by the CEP module 12, is now generated by the VNF module 54.

```
1: public static void main(String[ ] args) {
2: Configuration cepConfig=new Configuration( )
3: cepConfig.addEventType("SensorReading",
   SensorReading.class.getName( );
4: EPServiceProvider cep=
   EPServiceProviderManager.getProvider("CEP Module",
   cepConfig);
5: EPRuntime cepRT=cep.getEPRuntime( )
6: EPAdministrator cepAdm=cep.getEPAdministrator( )
7: EPStatement cepStatement=cepAdm.createEPL("se-
   lect * from SensorReading(type='Temperature').win:
   length(2) having avg(value)>6.0");
8: cepStatement.addListener(new CEPListener( );
   }
}
9: public static class CEPListener implements UpdateLis-
   tener {
10: public void update(EventBean[ ] newData, Event-
    Bean[ ]
    oldData) {
11: System.out.println("Event received:"+
    newData[0].getUnderlying( );
    }
}
```

TABLE 1

```
struct ofp_action_window {
    uint16_t type; /* OF_PAT_WINDOW */
```

TABLE 1-continued

```
    uint16_t size;
    uint32_t timeout;
    uint32_t window_id;
}
struct ofp_action_workclause {
    uint16_t type; /* OF_PAT_WORK_CLAUSE */
    uint16_t math_type;
    uint32_t window_id;
    uint32_t query_id;
}
```

Example Code Snippet

In an OpenFlow SDN implementation, in one embodiment, the OpenFlow of p_action_type enumeration may be extended with two descriptors, OF_PAT_WINDOW and OF_PAT_WORKCLAUSE. The actions may be defined as follows:

An example in a network programming language such as P4, is as follows:

```
action window(size, timeout, window_id) {
    modify_field(local_metadata.copy_to_cep_buffer, 1);
    modify_field(local_metadata.window_id, window_id);
}
action workclause(math_type, window_id, query_id) {
    field_list_calculation_declaration ::= field_list_calculation
    average_temp {
        input
        {
            [ temperature ; ] +
        }
        algorithm : compute_average;
        output_width : 32 ;
    }
}
```

In the above P4 example, "compute_average" uses a known mathematical formula for calculating the average of a set of values. The output of this field calculation is the average value of temperature fields taken from the packets 44 stored in the CEP buffer 56. This action may be called when the CEP buffer 56 is full, or when a timeout occurs for the CEP buffer 56.

Another example in P4, is as follows:

```
action window(size, timeout, window_id) {
    modify_field(local_metadata.copy_to_cep_buffer, 1);
    modify_field(local_metadata.window_id, window_id);
}
action workclause(math_type, window_id, query_id) {
    field_list_calculation_declaration ::= field_list_calculation
    face_indication {
        input
        {
            [ jpeg_header ; restart_marker_header;
            quantization_table_header; jpeg_payload; ] +
        }
        algorithm : face_detection;
        output_width : 2 ;
    }
}
```

In this example, the packets 44 may comprise imagery, and "face_detection" is an algorithm for detecting that faces exist in such imagery (such algorithms are known to those of skill in the art). The output of this field calculation may be a binary value, which by convention may be 0 (false) when there are no faces in the video frame and 1 (true) when there are faces in the imagery. The list of fields identified above, such as jpeg_header and the like are identified in RFC 2435 "RTP Payload Format for JPEG-compressed Video". In some embodiments, the EMM 50 may have access to such information in the form of an electronic mapping or reference structure that is stored or otherwise maintained by the EMM 50, as discussed above.

Assume for purposes of illustration that only these two field calculations are implemented by the datapath node 38. The work clause action may be expressed in the following manner:

```
action workclause(math_type, window_id, query_id) {
    if (math_type == AVERAGE_VALUE)
        update average_temp if (valid(temperature));
    else
    if (math_type == FACE_DETECT_VALUE)
```

Figure 4:
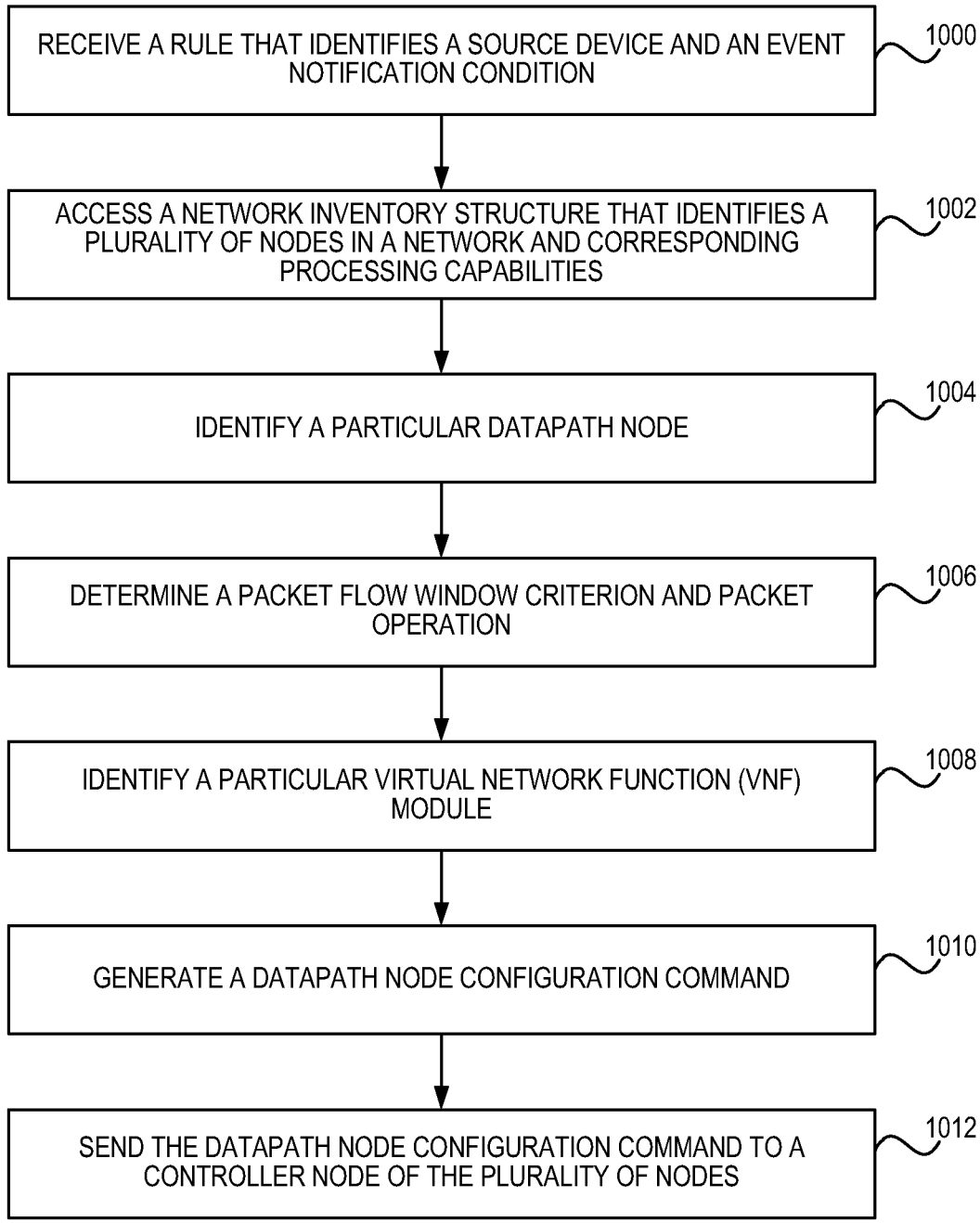
FIG. 4 is flowchart of a method of operation of an efficiency manager module according to one embodiment.

FIG. 4 is flowchart of a method of operation of the EMM 50 according to one embodiment. FIG. 4 will be discussed in conjunction with FIG. 3. The EMM 50 receives the high-level application rules 64 that identify the source device 42 and an event notification condition (FIG. 4, block 1000). The EMM 50 accesses the network inventory structure 72 that identifies a plurality of nodes in the SDN 36 and corresponding processing capabilities (FIG. 4, block 1002). The EMM 50 identifies the particular ingress datapath node 38-I of the plurality of nodes based on the source device 42 and corresponding processing capability of the ingress datapath node 38-I (FIG. 4, block 1004). The EMM 50 determines the packet flow window criterion 90 and the packet operation parameter 94-1 (FIG. 4, block 1006). The EMM 50 identifies the particular virtual network function (VNF) module 54 based on the rule (FIG. 4, block 1008). The EMM 50 generates the controller node datapath configuration command that comprises a source device identifier that identifies the source device 42, the packet flow window criterion 90, the packet operation parameter 94-1, and the CEP VNF UUID parameter 94-4 that identifies the particular VNF module 54 (FIG. 4, block 1010). The EMM 50 sends the controller node datapath configuration command 66 to the 52 controller node (FIG. 4, block 1012).

The EMM 50 may also generate the controller node VNF configuration command 68 that identifies the particular VNF module 54, and send the controller node VNF configuration command 68 to the controller node 52.

Figure 5:
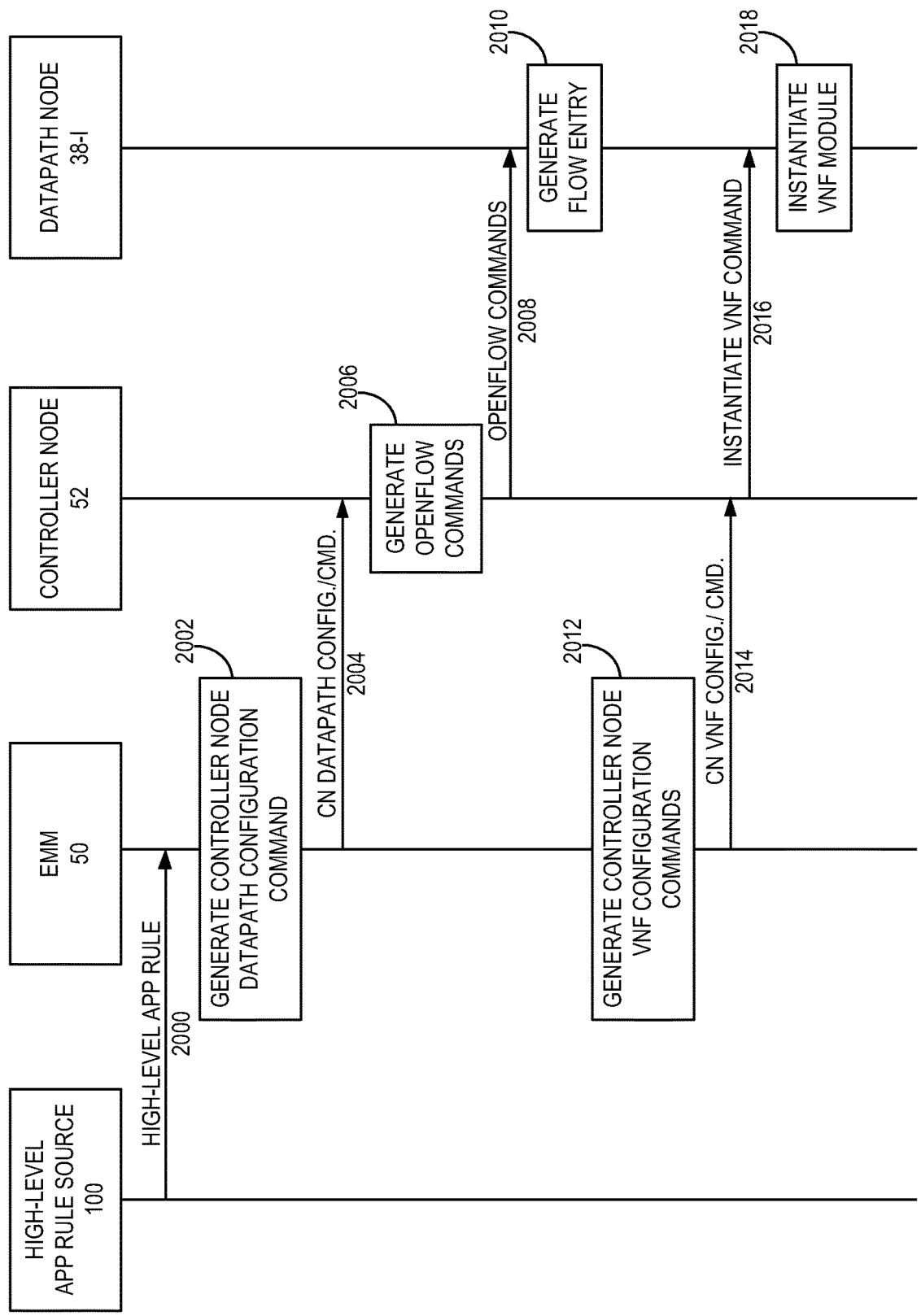
FIG. 5 is a message flow diagram illustrating an example flow of messages between components discussed above with regard to FIGS. 4-6 according to one embodiment.

FIG. 5 is a message flow diagram illustrating an example flow of messages between components discussed above with regard to FIGS. 4-6 according to one embodiment. The EMM 50 receives the high-level application rule 64 from a high-level application rule source 100 (step 2000). In one embodiment, the high-level application rule source 100 may comprise, for example, a developer, or other entity responsible for generating high-level application rules 64. The EMM 50 generates the controller node datapath configuration command 66, and sends the controller node datapath configuration command 66 to the controller node 52 (steps 2002-2004). The controller node 52 receives the controller node datapath configuration command 66 and generates OpenFlow commands based on the controller node datapath configuration command 66 (step 2006). The controller node 52 communicates the OpenFlow commands to the ingress datapath node 38-I (step 2008). The ingress datapath node 38-I receives the OpenFlow commands and generates a flow entry (step 2010).

The EMM 50 also generates the controller node (CN) VNF configuration command 68, and sends the controller node VNF configuration command 68 to the controller node 52 (steps 2012-2014). The controller node 52 determines that the VNF module 54 may be executed on the ingress datapath node 38-I, and sends a message to the ingress datapath node 38-I to instantiate the VNF module 54 (step 2016). The ingress datapath node 38-I receives the message, and instantiates the VNF module 54 (step 2018).

Figure 6:
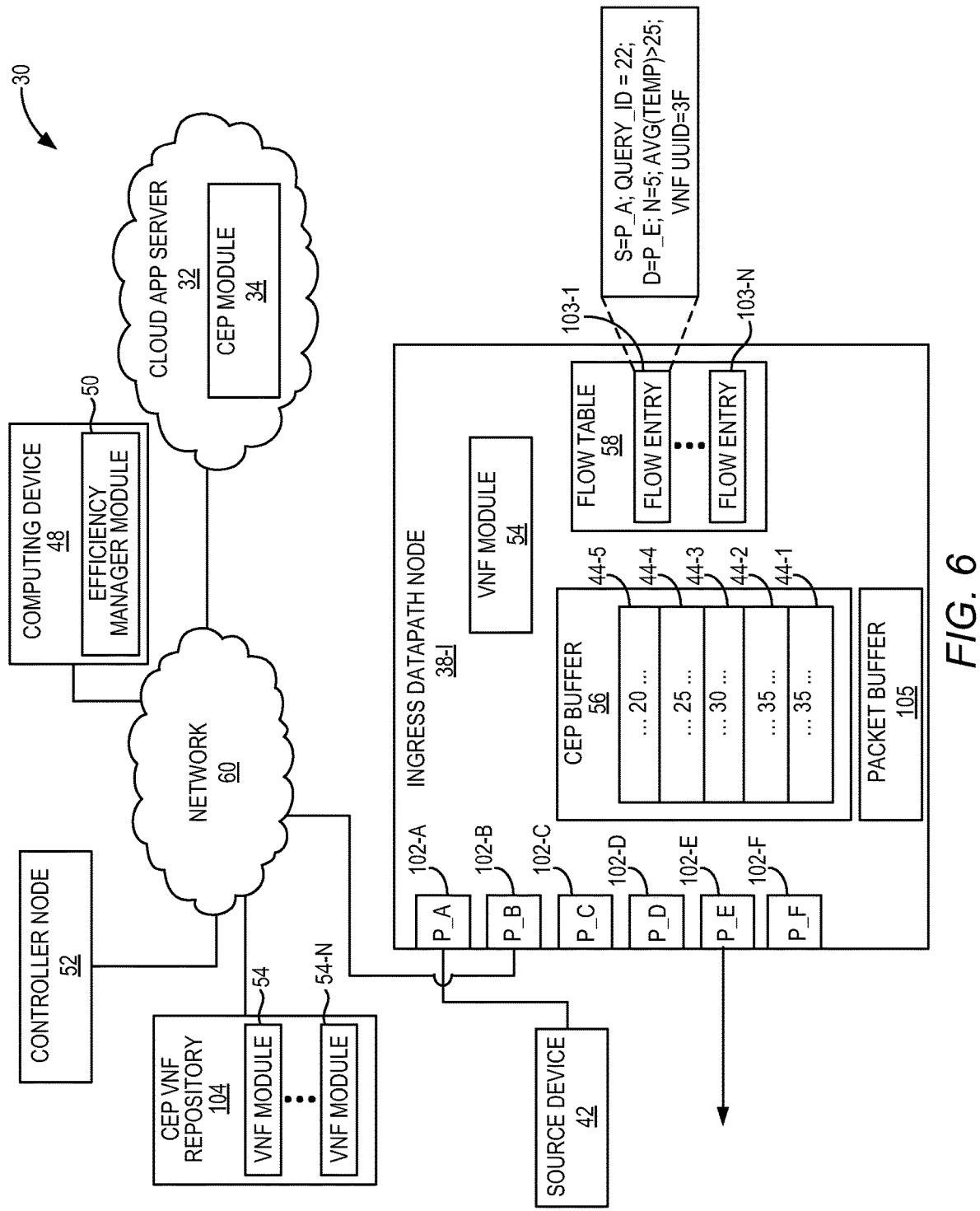
FIG. 6 is a block diagram of the system illustrated in FIG. 2, with certain components illustrated in greater detail, and certain components omitted for purposes of illustration.

FIG. 6 is a block diagram of the system 30 illustrated in FIG. 2, with certain components illustrated in greater detail, and certain components omitted for purposes of illustration. The ingress datapath node 38-I has a plurality of ports 102-A-102-F. The source device 42 is coupled to the ingress datapath node 38-I via the port 102-A. Assume that the controller node 52 receives, from the EMM 50 a controller node datapath configuration command 66. The controller node 52 generates OpenFlow commands based on the controller node datapath configuration command 66 and sends the OpenFlow commands to the ingress datapath node 38-I. The ingress datapath node 38-I receives the OpenFlow commands and generates a flow entry 103-1 in the flow table 58. Based on the OpenFlow commands, the flow entry 103-1 identifies the source device 42 and indicates that packets 44 received from the source device 42 should be forwarded via port 102-E to an egress datapath node 38-E (not illustrated). The flow entry 103-1 also identifies a query_ID of 22, a packet flow window criterion of 5, and a packet operation wherein the ingress datapath node 38-I determines the average temperature identified in packets stored in the CEP buffer 56. The flow entry 103-1 also identifies a packet condition, wherein if the five packets stored in the CEP buffer 56 have an average temperature greater than 25 degrees a notification event is to be sent to the VNF module 54. The OpenFlow commands also identify the VNF module 54 via a VNF UUID of "3F."

The controller node 52 also receives, from the EMM 50, a controller node VNF configuration command 68. The controller node VNF configuration command 68 identifies the VNF module 54. In one embodiment, the controller node 52 accesses the VNF module 54 from a VNF module repository 104, and sends the VNF module 54 to the ingress datapath node 38-I for execution. In other embodiments, the VNF module 54 may already be resident on the ingress datapath node 38-I, and the controller node 52 sends instructions to the ingress datapath node 38-I to initiate execution of the VNF module 54. In yet another embodiment, the VNF module 54 may execute on a computing device separate from the ingress datapath node 38-I.

The ingress datapath node 38-I receives, in a packet buffer 105, packets 44 from the source device 42. As the packets 44 are buffered in the packet buffer 105, the packets 44 are copied from the packet buffer 105 to the CEP buffer 56. Ultimately, the CEP buffer 56 contains five packets 44-1-44-5. The ingress datapath node 38-I performs the packet operation on the packets 44-1-44-5 to determine an average temperature. The ingress datapath node 38-I determines that the average temperature is greater than 25 degrees, and thus generates and sends a notification to the VNF module 54 with the query_ID of 22. The notification may include data from the packets 44-1-44-5, such as the temperature data or may include the complete packets 44-1-44-5. The ingress datapath node 38-I may then clear the CEP buffer 56 in preparation for buffering the next five packets 44 received from the source device 42.

The VNF module 54 receives the notification, and performs additional filtering, to determine if the event notification condition provided in the high-level application rule 64 has occurred. If so, the VNF module 54 may generate an event notification, and communicate the event notification to the CEP module 34. While for purposes of illustration only a single CEP module 34 is illustrated, it should be appreciated that the system 30 may comprise any number of CEP modules 34, and that such CEP modules 34 may be arranged hierarchically, such that a series of notifications are successively filtered by multiple CEP modules 34. Similarly, while only a single VNF module 54 is illustrated, it should be appreciated that multiple VNF modules 54 may be implemented, particularly in embodiments wherein multiple source devices 42 are utilized.

Figure 7:
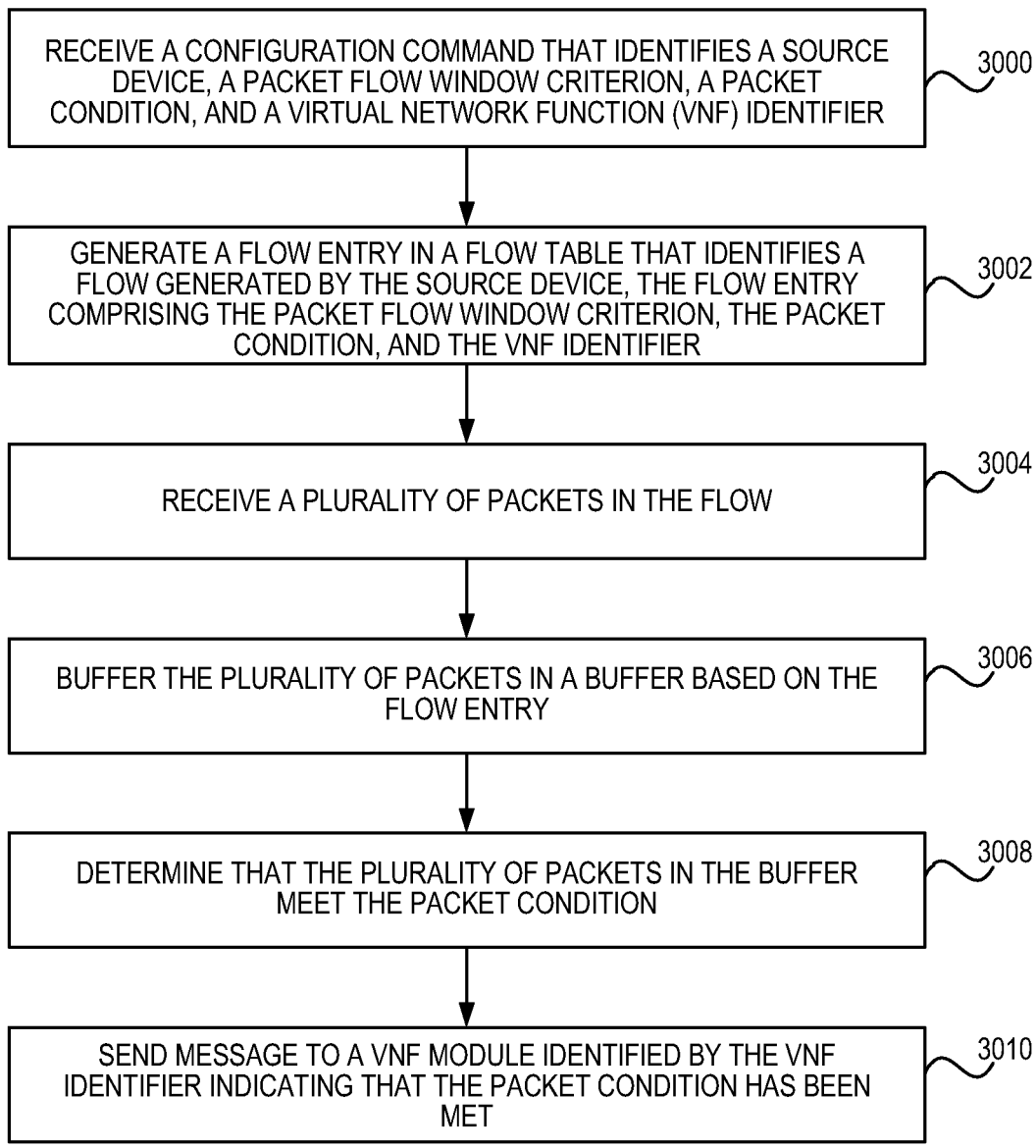
FIG. 7 is a flowchart of a method of operation of a datapath node according to one embodiment.

FIG. 7 is a flowchart of a method of operation of the datapath node according to one embodiment. FIG. 7 will be discussed in conjunction with FIG. 6. The datapath node receives a configuration command, in the form of OpenFlow commands in one embodiment, that identifies the source device 42, a packet flow window criterion, a packet condition, and a VNF identifier that identifies the VNF module 54 (FIG. 7, block 3000). The ingress datapath node 38-I generates the flow entry 103-1 in the flow table 58 that identifies a flow generated by the source device 42, the packet flow window criterion, the packet condition, and the VNF identifier (FIG. 7, block 3002). The ingress datapath node 38-I receives the packets 44-1-44-5 (FIG. 7, block 3004). The ingress datapath node 38-I buffers the plurality of packets 44-1-44-5 in the CEP buffer 56 based on the flow entry 103-1 (FIG. 7, block 3006). The ingress datapath node 38-I performs the packet operation on the packets 44-1-44-5 to determine the average temperature of the packets 44-1-44-5. The ingress datapath node 38-I also determines that the average temperature meets the specified packet condition (FIG. 7, block 3008). The ingress datapath node 38-I sends an event notification to the VNF module 54 (FIG. 7, block 3010).

Figure 8:
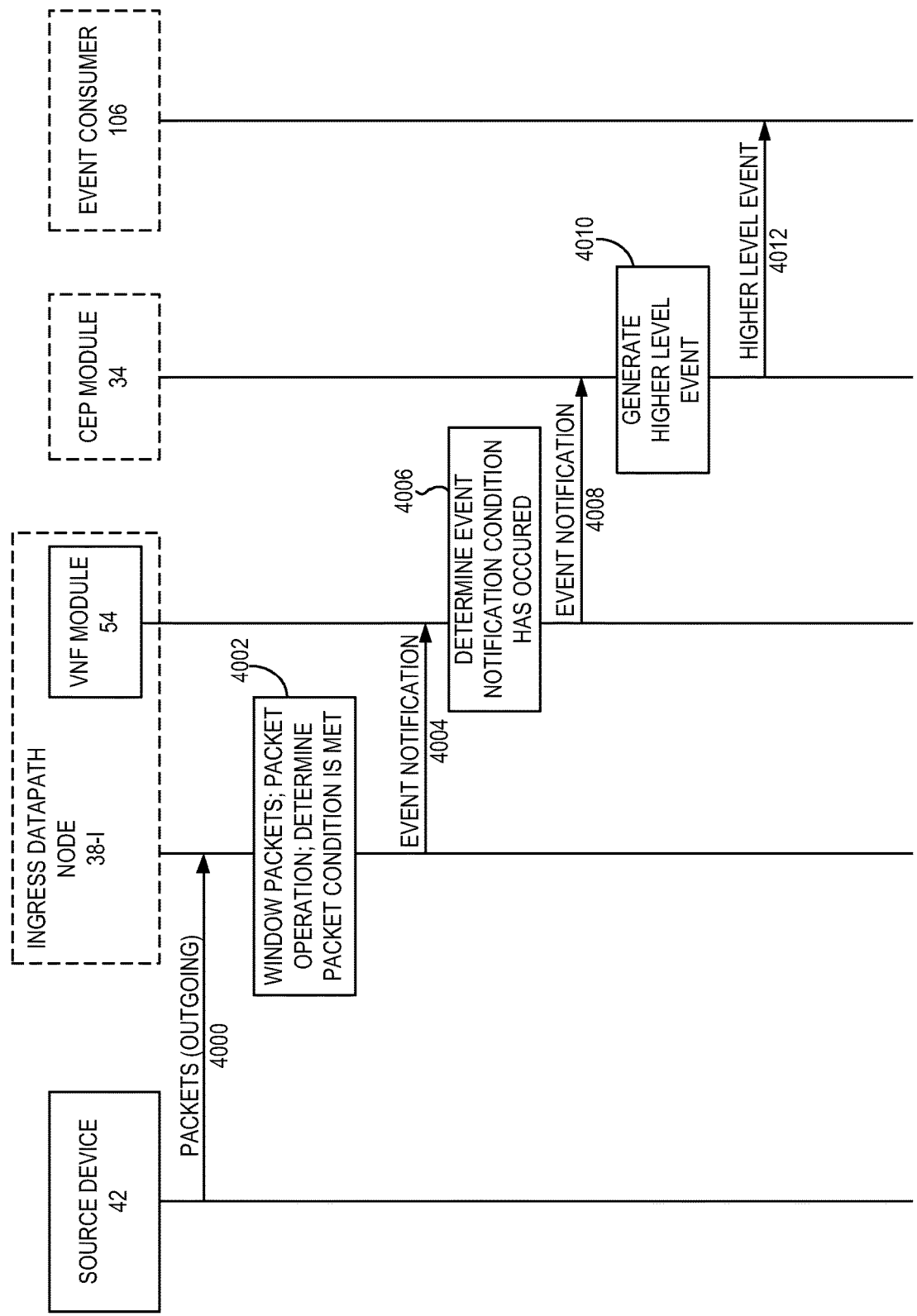
FIG. 8 is message flow diagram illustrating an example flow of messages between components discussed with regard to FIGS. 6-7.

FIG. 8 is message flow diagram illustrating an example flow of messages between components discussed above with regard to FIGS. 6-7. The source device 42 sends packets 44 to the ingress datapath node 38-I on an ongoing basis (step 4000). The ingress datapath node 38-I windows packets 44, executes the packet operation to determine an average temperature, and determines that the average temperature meets the identified packet condition "AVG(TEMP)>25" (step 4002). The ingress datapath node 38-I sends an event notification to the VNF module 54 (step 4004). The VNF module 54 receives the event notification, performs additional filtering, and determines that the event notification condition has occurred (step 4006). The VNF module 54 sends an event notification condition to the CEP module 34 (step 4008). The CEP module 34 may generate a higher level event and send the higher level event to an event consumer 106 (steps 4010-4012). While only one event consumer 106 is illustrated, it will be apparent that the CEP module 34 may generate and send higher level events to any number of event consumers 106, and that different higher level events may be generated for different event consumers 106.

Figure 9:
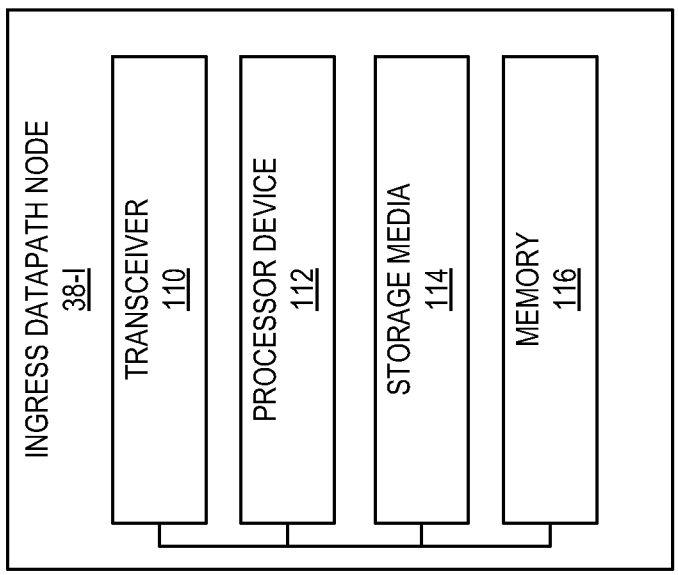
FIG. 9 is a block diagram of a datapath node according to one embodiment.

While the ingress datapath node 38-I may be implemented in any type of hardware or any combination of hardware and software, FIG. 9 is a block diagram of the ingress datapath node 38-I according to one embodiment. The ingress datapath node 38-I includes, for example, a transceiver 110 and a processor device 112. The transceiver 110 generally includes components configured to facilitate sending and receiving data to and from other nodes, such as other datapath nodes 38 and/or controller nodes 52. Of course, the detailed operation for the transceiver 110 and the processor device 112 will vary depending on both the particular implementation and the standard or standards supported by the ingress datapath node 38-I. Those skilled in the art will appreciate that the block diagram of the ingress datapath node 38-I necessarily omits numerous features that are not necessary to a complete understanding of this disclosure. Although all of the details of the processor device 112 are not illustrated, the processor device 112 comprises one or several general-purpose or special-purpose processors or other microcontrollers programmed with suitable software programming instructions and/or firmware to carry out some or all of the functionality of the ingress datapath node 38-I described herein. In addition, or alternatively, the processor device 112 comprises various digital hardware blocks (i.e., one or more Application Specific Integrated Circuits (ASICs), one or more off-the-shelf digital or analog hardware components, or a combination thereof) configured to carry out some or all of the functionality of the ingress datapath node 38-I described herein.

The ingress datapath node 38-I may also include one or more storage media 114 and a memory 116 for storing data necessary and/or suitable for implementing the functionality described herein, as well as for storing complex programming instructions which, when executed on the processor device 112, may implement all or part of the functionality described herein. One embodiment of the disclosure may be implemented as a computer program product that is stored on a computer-readable storage medium, the computer program product including complex programming instructions that are configured to cause the processor device 112 to carry out the steps described herein. In one embodiment, a carrier containing the computer program product is provided, wherein the carrier is one of an electronic signal, an optical signal, a radio signal, or the computer readable storage medium (i.e., a non-transitory computer readable medium). The controller node 52 may comprise similar components as those discussed herein with regard to FIG. 9.

Figure 10:
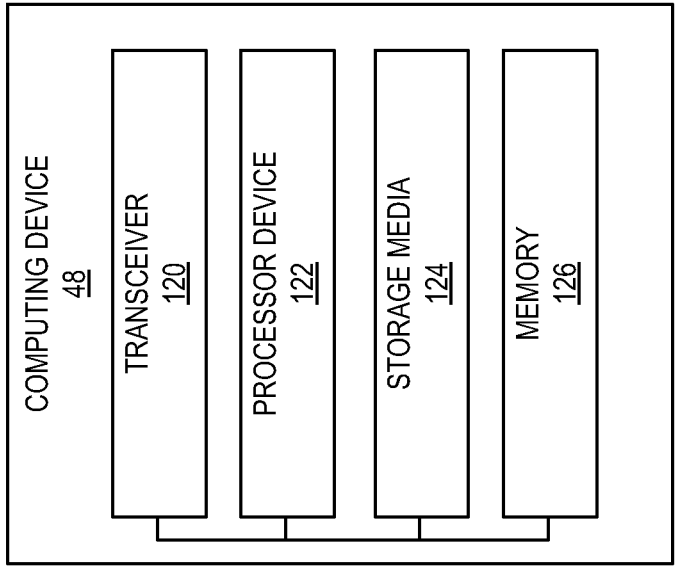
FIG. 10 is a block diagram of a computing device according to one embodiment.

While the computing device 48 may be implemented in any type of hardware or any combination of hardware and software, FIG. 10 is a block diagram of the computing device 48 according to one embodiment. The computing device 48 includes, for example, a transceiver 120 and a processor device 122. The transceiver 120 generally includes components configured to facilitate sending and receiving data to and from other devices, such as the controller nodes 52. Of course, the detailed operation for the transceiver 120 and the processor device 122 will vary depending on both the particular implementation and the standard or standards supported by the computing device 48. Those skilled in the art will appreciate that the block diagram of the computing device 48 necessarily omits numerous features that are not necessary to a complete understanding of this disclosure. Although all of the details of the processor device 122 are not illustrated, the processor device 122 comprises one or several general-purpose or special-purpose processors or other microcontrollers programmed with suitable software programming instructions and/or firmware to carry out some or all of the functionality of the computing device 48 described herein. In addition, or alternatively, the processor device 112 comprises various digital hardware blocks (i.e., one or more ASICs, one or more off-the-shelf digital or analog hardware components, or a combination thereof) configured to carry out some or all of the functionality of the computing device 48 described herein.

The computing device 48 may also include one or more storage media 124 and a memory 126 for storing data necessary and/or suitable for implementing the functionality described herein, as well as for storing complex programming instructions which, when executed on the processor device 122, may implement all or part of the functionality described herein. One embodiment of the disclosure may be implemented as a computer program product that is stored on a computer-readable storage medium, the computer program product including complex programming instructions that are configured to cause the processor device 122 to carry out the steps described herein. In one embodiment, a carrier containing the computer program product is provided, wherein the carrier is one of an electronic signal, an optical signal, a radio signal, or the computer readable storage medium (i.e., a non-transitory computer readable medium).

The following acronyms are used throughout this disclosure.

ASICs Application Specific Integrated Circuits
CDM Compilation/Decomposition Module
CN Controller Node
CEP Complex Event Processing
DSL Domain Specific Language
EMM Efficiency Manager Module
IoT Internet of Things
M2M Machine to Machine
SDN Software-Defined Network
SP Stream Processing
UUID Universally Unique Identifier
VNF Virtual Network Function
CDR Charging/Call Data Records Those skilled in the art will recognize improvements and modifications to the embodiments of the present disclosure. All such improvements and modifications are considered within the scope of the concepts disclosed herein and the claims that follow.

What is claimed is:

1. A method, comprising:
receiving, by a computing device comprising a processor device, a rule that identifies a source device and an event notification condition;
accessing a network inventory structure that identifies a plurality of nodes in a network and corresponding processing capabilities;
identifying a particular datapath node of the plurality of nodes based on the source device and a corresponding processing capability of the particular datapath node;
determining a packet flow window criterion and a packet operation;
identifying a particular virtual network function (VNF) of a plurality of VNFs based on the rule;
generating a controller node datapath configuration command that comprises a source device identifier that identifies the source device, the packet flow window criterion, the packet operation, and a VNF identifier that identifies the particular VNF; and
sending the controller node datapath configuration command- to a controller node of the plurality of nodes.

2. The method of claim 1, further comprising:
generating a controller node VNF configuration command that identifies the particular VNF;
sending the controller node VNF configuration command to the controller node.

3. The method of claim 1, wherein determining the packet flow window criterion and the packet operation further comprises:
accessing a decomposition template structure that comprises a plurality of decomposition templates;
selecting a particular decomposition template of the plurality of decomposition templates based on the rule; and
based on the particular decomposition template, determining the packet flow window criterion and the packet operation based on the event notification condition.

4. The method of claim 1, wherein the packet flow window criterion identifies a number of incoming packets of a flow to be stored in a buffer by the particular datapath node.

5. The method of claim 4, wherein the packet flow window criterion further identifies a timeout value that identifies a time interval after which the buffer is to be cleared.

6. The method of claim 4, wherein the packet operation comprises a mathematical operation to be applied to the incoming packets stored in the buffer.

7. The method of claim 1, wherein the source device comprises a sensor configured to stream data that quantifies a sensed attribute.

8. The method of claim 1, wherein identifying the particular VNF of the plurality of VNFs based on the rule further comprises:
accessing a decomposition template structure that comprises a plurality of decomposition templates;
selecting a particular decomposition template of the plurality of decomposition templates based on the rule; and
based on the particular decomposition template, identifying the particular VNF of the plurality of VNFs.

9. A computing device for implementing packet filtering in a network, the computing device comprising:
a transceiver configured to be coupled to a network; and
a processor device coupled to the transceiver and configured to:
receive a rule that identifies a source device and an event notification condition;
access a network inventory structure that identifies a plurality of nodes in the network and corresponding processing capabilities;
identify a particular datapath node of the plurality of nodes based on the source device and a corresponding processing capability of the particular datapath node;
determine a packet flow window criterion and a packet operation;
identify a particular virtual network function (VNF) of a plurality of VNFs based on the rule;
generate a controller node datapath configuration command that comprises a source device identifier that identifies the source device, the packet flow window criterion, the packet operation, and a VNF identifier that identifies the particular VNF; and
send the controller node datapath configuration command to a controller node of the plurality of nodes.

10. The computing device of claim 9, wherein the processor device is further configured to:
generate a controller node VNF configuration command that identifies the particular VNF;
send the controller node VNF configuration command to the controller node.

11. A method for sending an event notification, the method comprising:
receiving, from a controller node by a datapath node comprising a processor device, a configuration command that identifies a source device, a packet flow window criterion, a packet condition, and a virtual network function (VNF) identifier;
generating a flow entry in a flow table that identifies a flow generated by the source device;
receiving a plurality of packets in the flow;

buffering the plurality of packets in a buffer based on the flow entry;

determining that the plurality of packets in the buffer meets the packet condition; and based on determining that the plurality of packets in the buffer meets the packet condition, sending a first event notification to a VNF identified by the VNF identifier indicating that the packet condition has been met.

12. The method of claim 11, further comprising:

forwarding the plurality of packets to a downstream datapath node.

13. The method of claim 11, wherein the packet flow window criterion identifies a number N of packets to be stored in the buffer, and wherein buffering at least some of the plurality of packets in the buffer based on the flow entry comprises buffering the N packets in the buffer.

14. The method of claim 13, wherein the configuration command further identifies a packet operation to be performed on the packets, and the packet condition is based on a result of the packet operation.

15. The method of claim 11, wherein each packet includes a sensor value that quantifies a sensed characteristic, and wherein the event notification includes the sensor values from each packet in the buffer.

16. The method of claim 11, further comprising:

clearing the buffer;

receiving a second plurality of packets in the flow;

buffering the second plurality of packets in the buffer based on the flow entry;

determining that the second plurality of packets meets the packet condition; and based on determining that the second plurality of packets meets the packet condition, sending a second event notification to the VNF identified by the VNF identifier indicating that the packet condition has been met.

17. The method of claim 11, further comprising:

receiving, by the VNF, the first event notification, the event notification including sensor values that quantify a sensed characteristic;

determining a query associated with the first event notification;

based on the query, determining that the sensor values meet a predetermined condition;

generating a second event notification in response to determining that the sensor values meet the predetermined condition; and sending the second event notification to a remote complex event processor module.

18. A datapath node comprising:

a transceiver configured to be coupled to a network; and a processor device coupled to the transceiver and configured to:

receive, from a controller node, a configuration command that identifies a source device, a packet flow window criterion, a packet condition, and a virtual network function (VNF) identifier;

generate a flow entry in a flow table that identifies a flow generated by the source device;

receive a plurality of packets in the flow;

buffer the plurality of packets in a buffer based on the flow entry;

determine that the plurality of packets in the buffer meets the packet condition; and based on determining that the plurality of packets in the buffer meets the packet condition, send an event notification to a VNF identified by the VNF identifier indicating that the packet condition has been met.

19. A controller node comprising:

a transceiver configured to be coupled to a network; and a processor device coupled to the transceiver and configured to:

receive a controller node datapath configuration command that comprises a source device identifier that identifies a source device, a packet flow window criterion, a packet operation, and a virtual network function (VNF) identifier that identifies a particular VNF of a plurality of VNFs;

generate a configuration command that includes the packet flow window criterion and a datapath node work clause; and send the configuration command to a datapath node that receives a flow of packets generated by the source device.

20. The controller node of claim 19, wherein the processor device is further configured to:

initiate the particular VNF.

21. The controller node of claim 20, wherein the particular VNF is initiated on the datapath node.

* * * * *